United States Patent [19]

Sato et al.

[11] Patent Number: 4,707,363
[45] Date of Patent: Nov. 17, 1987

[54] SOFT STARCHY CHEWING GUM

[75] Inventors: Yoshinori Sato, Niiza; Yukio Tsuchiya, Tama; Keiji Fujimoto, Urawa, all of Japan

[73] Assignee: Lotte Co., Ltd., Tokyo, Japan

[21] Appl. No.: 735,761

[22] Filed: May 20, 1985

[51] Int. Cl.⁴ .............................................. A23G 3/30
[52] U.S. Cl. ......................................................... 426/3
[58] Field of Search ........................................ 426/3–6, 426/661

[56] References Cited

U.S. PATENT DOCUMENTS

| 4,208,431 | 6/1980 | Friello et al. | 426/3 |
| 4,271,197 | 6/1981 | Hopkins et al. | 426/3 |

FOREIGN PATENT DOCUMENTS

| 0053844 | 6/1982 | European Pat. Off. | 426/3 |
| 2710579 | 9/1978 | Fed. Rep. of Germany | 426/3 |
| 0024226 | 6/1974 | Japan | 426/3 |
| 0144852 | 11/1980 | Japan | 426/3 |
| 56-78560 | 6/1981 | Japan . | |
| 57-46347 | 10/1982 | Japan . | |
| 57-198051 | 12/1982 | Japan . | |
| 58-8819 | 2/1983 | Japan . | |
| 0111644 | 7/1983 | Japan | 426/5 |
| 0198250 | 11/1983 | Japan | 426/3 |
| 0074953 | 4/1984 | Japan | 426/3 |

Primary Examiner—Jeanette Hunter
Attorney, Agent, or Firm—Sandler & Greenblum

[57] ABSTRACT

A soft starchy chewing gum capable of retaining its softness in an atmosphere of very low temperature contains, in substitution for a portion or all of sweetening malt honey, a preparation comprising a source of an α-starch consisting essentially of amylopectin, and a total water content of about 0.3 to 12% by weight which contributes to providing the soft starchy chewing gum with a consistency similar to rice cake. The chewing gum may be fabricated into a stuffed chewing gum enclosing a center filling, such as bean jam, jelly, ice-cream or the like.

18 Claims, No Drawings

SOFT STARCHY CHEWING GUM

BACKGROUND OF THE INVENTION

1. Technical Field of the Invention

This invention relates to a soft starchy chewing gum, more particularly to a chewing gum having a consistency similar to a soft rice cake and containing a preparation or glue including a source of an α-starch of substantially consisting essentially of amylopectin in substitution for a portion or all of sweeteners normally used in chewing gums.

2. Discussion of Material Information

Prior to the present invention, several types of chewing gum have been proposed which are soft or do not harden in an atmosphere of low temperature (for example, Japanese Patent Publication No. 46347/82, Japanese Opened Application No. 78560/81 and Japanese Opened Application No. 198051/82). These types of chewing gum, however, relate to gum base compositions, but not to chewing gum per se including a gum base, a malt honey, other sweeteners (such as sugars and artificial sweeteners), flavors and softeners. In the manufacture of chewing gum, it is generally known that malt honey or other softening agents (such as glycerol) can be added in an increased amount in order to maintain a soft consistency of the chewing gum. It is also well-known that malt honey may be included not only as a sweetener but also for the purpose of imparting softness to chewing gum. Those skilled in the art also recognize that the softening effect may be enhanced by the solution of sugars or sugar alcohols, an aqueous solution of vegetable gum, as well as softeners, such as glycerol and propylene glycol. Although these prior art techniques may impart the softness to the chewing gum at a relatively low temperature they can not maintain the softness at a low temperature below 0° C., such as −10° C. accordingly, chewing gums tend to harden at these temperatures which leads to brittleness in texture and deterioration of taste.

It is also well-known that sugars of low sweetness, such as glucose, lactose, maltose or dextrin, may be utilized in substitution for sucrose or saccharose in order to reduce the sweetness of the chewing gum. However, these ingredients suffer from disadvantages which include effecting a powdery feeling and of significantly hardening the chewing gum due to agglutination.

It has now been found, as a result of diligent study for producing a chewing gum capable of maintaining its softness throughout a year even at a low temperature, that substitution of a preparation including an α-starch consisting essentially of amylopectin for a portion or all of the malt honey achieves an improved soft chewing gum. By selecting other sugars in combination with the preparation or glue including a α-starch, the chewing gum of low sweetness may be obtained, which is able to keep its softness at a low temperature even below 0° C.

Further, it has now been found that, in case of chewing gum containing the preparation including α-starch, an increased water content of up to about 12%, which traditionally has been thought to cause the quality of the chewing gum to deteriorate, may be used to provide a novel type of chewing gum having a consistency similar to a soft rice cake.

Accordingly, an object of the invention is to provide a soft starchy chewing gum capable of maintaining its softness at a low temperature below 5° C. or even below 0° C.

Another object of the invention is to provide a soft chewing gum of low sweetness containing dextrin of DE 2 to 50 as a main sweetener in combination with the preparation including α-starch.

A further object of the invention is to provide a novel type of chewing gum having a consistency similar to a soft rice cake and yet exhibiting characteristics of chewing gum.

A still further invention is to provide a soft starchy chewing gum of a rice cake-like consistency, which encloses or contains a center filling, such as bean jam, jelly or the like.

SUMMARY OF THE INVENTION

In accordance with the present invention, above objects may be achieved by providing a soft starchy chewing gum having a general composition including a gum base, sweetners, flavors and other conventional, characterized in that the chewing gum contains, in substitution for a portion or all of a sweetening malt honey, an α-starch adhesive preparation for glue prepared by heat-treating a starch containing amylopectin with water and containing a total water content of about 0.3 to about 12% by weight.

In accordance with the invention, a chewing gum having consistency similar to a soft rice cake may be obtained by incorporating sufficient water to impart a total water content of about 5.5 to about 12% by weight to the chewing gum composition and subjecting the chewing gum to a rice cake shaping machine.

Further, in accordance with the invention, the chewing gum of rice cake consistency may be fabricated into a stuffed chewing gum containing a center filling.

The α-starch preparation or glue may be preferably incorporated into the chewing gum as a Turkish delight which has been heat-treated together with a portion of sweetening sugar.

PREFERRED EMBODIMENTS OF THE INVENTION

In accordance with the invention, the α-starch is preferably essentially amylopectin and may be selected from glutinous rice glutinous corn or, glutinous barley which is substantially free of amylose. Conveniently, rice-flour is used.

The preparation including α-starch useful in the invention may be prepared using the following procedure. The starch, such as the rice-flour, is kneaded with an adequate amount of water to prevent the formation of lumps prior to being subjected to steam for 20 to 30 minutes. The steamed mass is then placed into water for cooling and thereafter is mixed using a rice cake machine or a dumpling mixer to provide a glutinous consistency. Thereafter, a portion of sugar or other sweeteners may be incorporated, if desired, with heating, to form a Turkish delight, to which a material previously, prepared from egg white and water, may be added. When subjecting the formulation to the heat treatment, a ratio of the starch (consisting essentially of amylopectin) to water in the range of 1:0.5~3, and preferably 1:1~2, is used. In other words, a ratio of the rice-flour to water is in such a range that the resulting Turkish delight contains 20 to 50% by weight of water. A water content below 0.5% gives excessive elasticity which may deteriorate the texture of the chewing gum, while a water content above 3% provides excessive softness which may cause deterioration with time.

The α-starch preparation or glue thus prepared is incorporated into the chewing gum in substitution for a portion or all of the malt honey which would normally be used. In this case, an aliquot of water derived from the malt honey may be replaced with a corresponding amount of water contained in the α-starch preparation or glue. An amount of the α-starch preparation or glue is incorporated into the chewing gum in such a range that the resulting chewing gum contains about 0.3 to about 12% by weight of water. In the instance where the formulation has a water content of about 5.5 to 12% by weight, the resultant chewing gum exhibits a rice cake-like consistency.

In general, α-starch containing amylose is known to be converted to a hard β-form. To the contrary, the α-starch as defined herein consists essentially of amylopectin and is substantially free of amylose, so that the conversion to the β-form (or hardening phenomenon) does not occur.

The sweetening sugars as used in the invention may be monosaccharides (such as glucose, fructose, and xylose), disaccharides (such as sucrose, maltose and lactose), polysaccharides (such as dextrins), sugar alcohols (such as sorbitol, malthitol and xylitol), isomerized sugar and invert sugar. The use of sucrose as the main sweetener may provide a chewing gum which retains its softness at a low temperature even below $-10°$ C., while the use of dextrin of DE 2 to 50 as the main sweetener may provide a soft chewing gum of low sweetness.

Other ingredients, such as gum base, flavors and softeners as are well-known in the art may also be used. The soft starchy chewing gum according to the invention may otherwise be prepared in any conventional procedure using apparatus which are well-known in the art.

The chewing gum of rice cake consistency may also be fabricated into any conventional form of rice cake or into a stuffed chewing gum containing a center filling, such as bean jam, jelly, ice cream, chocolate, caramel or the like. In the case of the combination of the chewing gum according to the invention with a cold confectionery, the gum base for the cold confectionery is preferably used, as described in Japanese Patent Publication Nos. 46347/82 and 8819/83, both of which are assigned to the applicant. The former discloses the gum base comprising 5 to 15% of natural resins, 10 to 13% of vinyl acetate resins, 6 to 8% of ester gum and 15 to 25% of rubbers for the plate type chewing gum, while the latter patent discloses the gum base comprising 25 parts of natural rubbers, 19 parts of synthetic rubbers, 30 parts of vinyl acetate resins, 15 parts of wax, 16 parts of fillers for the bubble chewing gum.

The invention will be described with reference to the non-limiting Examples.

EXAMPLE 1

This Example illustrates the chewing gum retaining softness even below 0° C.

The chewing gum according to the invention was prepared, using the α-starch preparation or glue A (water content of 36.5%) or the α-starch glue B (water content of 32.0%) and other ingredients as shown in the Table below. A comparative chewing gum was also prepared by the same procedure and ingredients without the α-starch glue.

| Ingredients | Comp. Ex. 1 | Ex. 1 | Ex. 2 |
| --- | --- | --- | --- |
| Gum Base | $150^{Kg}$ | $150^{Kg}$ | $150^{Kg}$ |
| Sugar | 300 | 300 | 300 |
| Glucose | 80 | 103.5 | 101.2 |
| Malt Honey (water content of 15%) | 40 | — | — |
| α-Starch Glue A (water content of 36.5%) | — | 16.5 | — |
| α-Starch Glue B (water content of 32.0%) | — | — | 18.8 |
| Glycerol | 5 | 5 | 5 |
| Strawberry Flavor | 3 | 3 | 3 |
| Total | $578^{Kg}$ | $578^{Kg}$ | $578^{Kg}$ |
| Total Water Content | 1.04% | 1.04% | 1.04% |

The chewing gums thus prepared were tested for penetration of a loaded needle and breaking strength according to conventional methods. The results are shown in the following table.

| | Comp. Ex. 1 | Ex. 1 | Ex. 2 |
| --- | --- | --- | --- |
| Penetration (load 100 g, 5 sec.) | 2 (n = 7) | 18 (n = 7) | 20 (n = 7) |
| Breaking Strength (rheometer, Kg/cm$^2$) | 17.5 (n = 3) | 9.0 (n = 3) | 8.5 (n = 3) |

EXAMPLE 2

This Example illustrates the soft chewing gum of low sweetness with a curry flavor.

The soft chewing gum of low sweetness was prepared, using the α-starch glue C (water content of 28.75%) or the α-starch glue D (water content of 22.3%) in combination with sugars and dextrin of DE 25, as well as other ingredients, as shown in the table below. A comparative chewing gum using the malt honey but excluding the α-starch glue was also prepared in the same procedure.

| Ingredients | Comp. Ex. 2 | Ex. 3 | Ex. 4 |
| --- | --- | --- | --- |
| Gum Base | $175^{Kg}$ | $175^{Kg}$ | $175^{Kg}$ |
| Glucose | 95 | 60 | 60 |
| Maltose | 63 | 40 | 40 |
| Lactose | 31 | 20 | 20 |
| Malt Honey (water content of 15%) | 34.4 | — | — |
| Dextrin (DE 25) | 150 | 150 | 150 |
| α-Starch Glue C (water content of 28.75%) | — | 108.4 | — |
| α-Starch Glue D (water content of 22.3%) | — | — | 140 |
| Curry Powder | 10.4 | 10.4 | — |
| Seasoning | 26.2 | 26.2 | — |
| Refined Salt | 5 | — | 5 |
| Curry Flavor | 5.5 | 5.5 | 5.5 |
| Total | $595.5^{Kg}$ | $595.5^{Kg}$ | $595.5^{Kg}$ |
| Total Water Content | 0.87% | 5.23% | 5.24% |

The chewing gum thus prepared were evaluated in an organoleptic test by means of a panel consisting of 15 members. The results are shown in the following table.

| | Comp. Ex. 2 | Ex. 3 | Ex. 4 |
| --- | --- | --- | --- |
| Hardness on Chewing | 0 | 6 | 9 |
| Feeling | 0 | 10 | 5 |
| Taste Strength | 2 | 7 | 6 |

|  | Comp. Ex. 2 | Ex. 3 | Ex. 4 |
|---|---|---|---|
| Taste Durability | 4 | 5 | 6 |

In the above experiments, the following composition of the α-starch glue A to D were used:

|  | A | B | C | D |
|---|---|---|---|---|
| Rice-Flour | 19.2 | 25.0 | 22.0 | 17.0 |
| Sugar | 38.5 | 25.0 | 22.0 | 17.0 |
| Malt Honey (water content of 25%) | — | 23.0 | 29.4 | 22.8 |
| Maltose Syrup (Brix 75) | 7.7 | — | — | — |
| Egg White | — | 0.8 | 0.5 | 0.5 |
| Curry Powder | — | — | — | 7.4 |
| Seasoning | — | — | — | 18.7 |
| Refined Salt | — | — | 4.7 | — |
| Water | 34.6 | 26.2 | 21.4 | 16.6 |
| Total | 100 | 100 | 100 | 100 |
| Water Content (%) | 36.5 | 32.0 | 28.75 | 22.3 |

As apparent from the above results, the incorporation of the α-starch glue in substitution for a portion or all of the malt honey a soft chewing gum retaining its softness at a low temperature. Further, its combined use with dextrin of DE 2 to 50 may provide the soft chewing gum of low sweetness.

EXAMPLE 3

Two types of Turkish delight were prepared for use in the following Examples 4 to 5, using rice-flour of substantially amylopectin.

|  | A | B |
|---|---|---|
| Rice-Flour | 17 parts by wt. | 18 parts by wt. |
| Sugar | 37.5 | 30 |
| Malt Honey (water content of 25%) | — | 20 |
| Egg White | 0.5 | — |
| Water | 45 | 31 |
| Total | 100 | 100 |
| Water Content | 45 | 36 |

EXAMPLES 4 AND 5 INCLUDING COMPARATIVES 3 AND 4

The chewing gums or rice cake consistency according to the invention were prepared, using the Turkish delight A and B as described in Example 3, and other ingredients as shown in the Table below. Comparative chewing gum were also prepared in the same manner but using the malt honey in place of the Turkish delight.

| Ingredients | Ex. 4 parts | Ex. 5 parts | Comp. Ex. 3 parts | Comp. Ex. 4 parts |
|---|---|---|---|---|
| Gum Base | 150 | 150 | 150 | 150 |
| Sugar | 200 | 200 | 200 | 240 |
| Glucose | 147 | 100 | 100 | 100 |
| Malt Honey (water content of 25%) | — | 40 | 100 | 60 |
| Turkish delight A (water content of 45%) | 73 | — | — | — |
| Turkish delight B (water content of 36%) | — | 80 | — | — |
| Glycerol | 5 | 5 | 15 | 15 |
| Sorbitol Solution (water content of 30%) | — | — | 10 | 10 |
| Flavor | 3 | 3 | 3 | 3 |
| Total | 578 | 578 | 578 | 578 |
| Water Content | 5.70% | 6.71% | 4.84% | 3.11% |

The chewing gums of Example 4 and Comparative 3 were evaluated in an organoleptic test by a panel consisting of 30 members. The results are shown in the following table.

|  | Ex. 4 members | Comp. 3 members | No. Diff. members |
|---|---|---|---|
| Hardness on Chewing | 11 | 5 | 14 |
| Elasticity | 25 | 3 | 2 |
| Smoothness | 7 | 8 | 15 |
| Feeling of Rice Cake | 25 | 1 | 4 |
| Voluminous Feeling | 23 | 1 | 6 |
| Overall Evaluation | 25 | 2 | 3 |

The chewing gums of Example 5 and Comparative 4 were fabricated into stuffed chewing gums containing jam as a center filling by means of an enveloping machine. These two stuffed chewing gums were evaluated in another organoleptic test by a panel consisting of 30 members. The results are shown in the following table.

|  | Ex. 5 members | Comp. 4 members | No. Diff. members |
|---|---|---|---|
| Hardness on Chewing | 28 | 0 | 2 |
| Integrality Feeling | 25 | 2 | 3 |
| Elasticity | 18 | 7 | 5 |
| Smoothness | 10 | 6 | 14 |
| Voluminous Feeling | 15 | 8 | 7 |
| Feeling of Rice Cake | 26 | 0 | 4 |
| Overall Evaluation | 18 | 4 | 8 |

Comparison of Example 4 with Comparative 3 shows that the substitution of the Turkish delight for all of the malt honey provides a significant characteristic of rice cake.

Comparison of Example 5 with Comparative 4 also shows that the substitution of the Turkish delight for a portion of the malt honey provides a significant characteristic of rice cake.

EXAMPLE 6 AND COMPARATIVE 5

A soft chewing gum of low sweetness having a consistency of rice cake was prepared, using ingredients as shown in the Table below. A comparative chewing gum was also prepared by the same procedure but excluding the Turkish delight.

| Ingredients | Ex. 6 | Comp. 5 |
|---|---|---|
| Gum Base | 175 | 175 |
| Glucose | 60 | 60 |
| Maltose | 40 | 40 |
| Lactose | 20 | 20 |
| Malt Honey (water content of 25%) | — | 146 |
| Dextrin (DE 25) | 150 | 150 |

-continued

| Ingredients | Ex. 6 | Comp. 5 |
| --- | --- | --- |
| Turkish Delight A (water content of 45%) | 146 | — |
| Flavor | 3 | 3 |
| Refined Salt | 2 | 2 |
| Total | 596 | 596 |
| Water Content | 11% | 6.12% |

Comparison of Example 6 with Comparative 5 shows that the substitution of the Turkish delight A for all of the malt honey provides a very soft chewing gum of rice cake consistency, and that Comparative 5 provides a semi-fluid chewing gum which is deformed upon standing.

The chewing gum of Example 6 was fabricated into a stuffed chewing gum enclosing a bean jam by means of an enveloping machine. An usual stuffed, the rice cake hardened within four days and was infected with molds, whereas the stuffed chewing gum of the invention neither hardened nor became infected for two weeks. Upon chewing, the stuffed chewing gum of the invention was converted from the rice cake consistency to a bubble gum texture of good expansion.

What is claimed is:

1. A soft starchy chewing gum comprising a gum base and a Turkish delight preparation comprising a source of an α-starch consisting essentially of amylopectin, a sweetener, and water.

2. A soft starchy chewing gum according to claim 1 having a moisture content of about 5.5 to 12% by weight and the consistency of a rice cake.

3. A soft starchy chewing gum according to claim 2, wherein said sweetener comprises dextrin having a DE of 2 to 50.

4. A soft starchy chewing gum according to claim 1, having a moisture content within the range of about 0.3 to 12% by total weight.

5. A soft starchy chewing gum according to claim 4, wherein the chewing gum contains a total water content of about 0.3 to about 5.5% by weight.

6. A soft starchy chewing gum according to claim 1, wherein said composition further comprises additional sweetener.

7. A soft starchy chewing gum according to claim 6, wherein said sweetener comprises dextrin having a DE of 2 to 50.

8. A soft starchy chewing gum according to claim 6, wherein said additional sweetener is selected from the group consisting of monosaccharides, disaccharides, polysaccharides, sugar alcohols, isomerized sugar, and invert sugar.

9. A soft starchy chewing gum according to claim 8, wherein said disaccharides are selected from the group consisting of sucrose, maltose and lactose.

10. A soft starchy chewing gum according to claim 9, wherein said sweetener comprises sucrose.

11. A soft starchy chewing gum according to claim 6, wherein said additional sweetener is a dextrin having a DE of 2 to 50.

12. A soft starchy chewing gum according to claim 1, wherein said source of α-starch is selected from the group consisting of glutinous rice, glutinous corn and glutinous barley.

13. A soft starchy chewing gum according to claim 12, wherein said glutinous rice is in the form of rice flour.

14. A soft starchy chewing gum in the form a rice cake comprising gum base, sweeteners, flavors, and a Turkish delight preparation comprising water and a source of an α-starch consisting essentially of amylopectin, said chewing gum having a total moisture content of about 5.5 to about 12% by weight.

15. A soft starchy chewing gum in the form of a rice cake having a center filling, said chewing gum comprising gum base, sweeteners, flavors, and a preparation comprising water and a source of an α-starch consisting essentially of amylopectin, said chewing gum having a total water content of 5.5 to about 12% by weight.

16. A soft starchy chewing gum according to claim 15, wherein said preparation is a Turkish delight.

17. A soft starchy chewing gum according to claim 15, wherein said filling material is selected from the group consisting of a jam, a jelly, a nougat, a caramel, and an ice cream.

18. A method for making a soft chewing comprising:
(a) providing an aqueous composition including a Turkish delight preparation having a source of α-starch consisting essentially of amylopectin;
(b) adding said composition with mixing to a gum base; and
(c) forming the resultant mixture into chewing gum.

* * * * *